United States Patent
Yoshida et al.

(10) Patent No.: US 10,136,019 B2
(45) Date of Patent: Nov. 20, 2018

(54) ILLUMINATION APPARATUS, SENSOR UNIT, AND READING APPARATUS

(71) Applicant: CANON COMPONENTS, INC., Kodama-gun, Saitama (JP)

(72) Inventors: Hidemasa Yoshida, Saitama (JP); Yoshihiko Tsumekawa, Saitama (JP); Akihito Takeshita, Saitama (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 15/481,740

(22) Filed: Apr. 7, 2017

(65) Prior Publication Data

US 2017/0295289 A1 Oct. 12, 2017

(30) Foreign Application Priority Data

Apr. 8, 2016 (JP) ................. 2016-078130
Apr. 3, 2017 (JP) ................. 2017-073656

(51) Int. Cl.
*H04N 1/04* (2006.01)
*H04N 1/028* (2006.01)
*H04N 1/00* (2006.01)

(52) U.S. Cl.
CPC ..... *H04N 1/02825* (2013.01); *H04N 1/00013* (2013.01); *H04N 1/02835* (2013.01); *H04N 2201/0081* (2013.01); *H04N 2201/0094* (2013.01)

(58) Field of Classification Search
CPC ........... H04N 1/02825; H04N 1/00013; H04N 1/00835; H04N 1/02835; H04N 2201/0081; H04N 2201/0094

USPC ......................................... 358/484, 475, 509
See application file for complete search history.

(56) References Cited

U.S. PATENT DOCUMENTS

| 6,127,675 | A  | * | 10/2000 | Nakamura | ......... H04N 1/02815 250/227.26 |
| 6,375,335 | B1 | * | 4/2002  | Tabata   | ................... G02B 6/002 362/23.09 |
| 7,088,905 | B1 | * | 8/2006  | Nemoto   | ............... G02B 6/0038 362/610 |
| 7,903,298 | B2 | * | 3/2011  | Sawada   | ............. H01L 27/14629 358/475 |

(Continued)

FOREIGN PATENT DOCUMENTS

| JP | 2013157841 A | 8/2013 |
| JP | 2014090403 A | 5/2014 |

*Primary Examiner* — Cheukfan Lee
(74) *Attorney, Agent, or Firm* — Rossi, Kimms & McDowell LLP

(57) ABSTRACT

An illumination apparatus includes a light source and an elongated light guide, wherein the light guide includes an emission surface that emits light from the light source and a reflection surface that reflects the light to the emission surface, the reflection surface includes a plurality of diffusion portions that diffuse the light, the diffusion portions have a shape of part of a sphere recessed from the reflection surface, a depth of the diffusion portions from the reflection surface is equal to or greater than 16.5% and equal to or smaller than 50% of a diameter of the sphere, and a width of the diffusion portions is equal to or greater than 0.1 mm and equal to or smaller than 50% of a width of the reflection surface.

8 Claims, 10 Drawing Sheets

(56) References Cited

U.S. PATENT DOCUMENTS

| | | | |
|---|---|---|---|
| 2003/0058381 A1* | 3/2003 | Shinohara | G02B 6/0016 349/63 |
| 2006/0165370 A1 | 7/2006 | Nemoto et al. | |
| 2011/0096567 A1* | 4/2011 | Tiao | G02B 6/0043 362/607 |
| 2013/0194641 A1 | 8/2013 | Ouchi | |
| 2014/0112020 A1* | 4/2014 | Shimoda | H04N 1/02835 362/613 |
| 2016/0231492 A1* | 8/2016 | Nakayama | G02B 6/0061 |

* cited by examiner

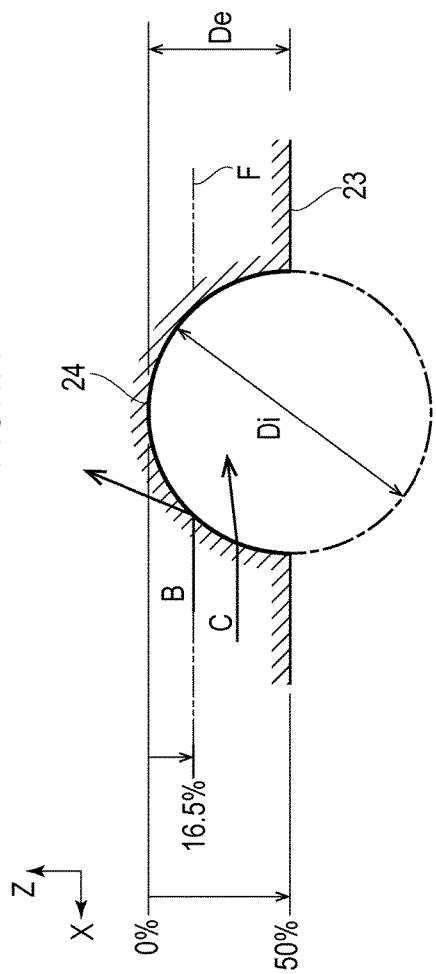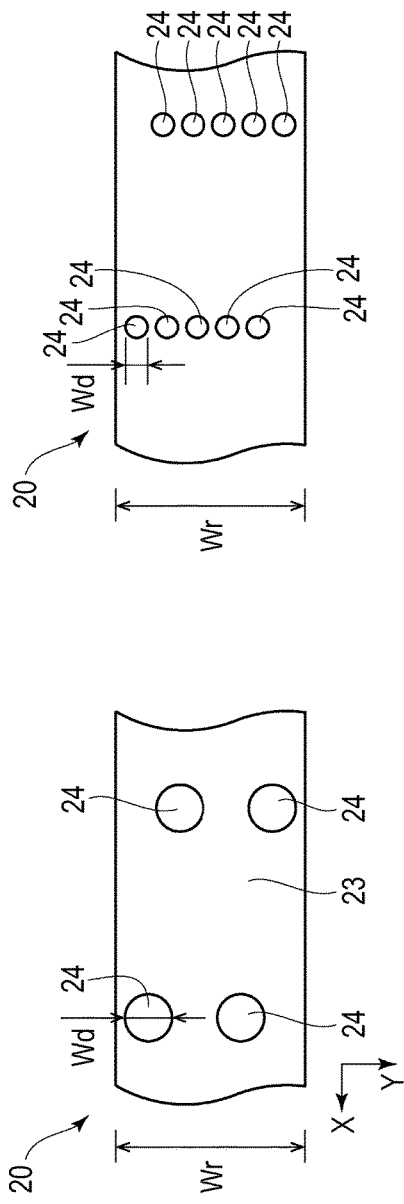

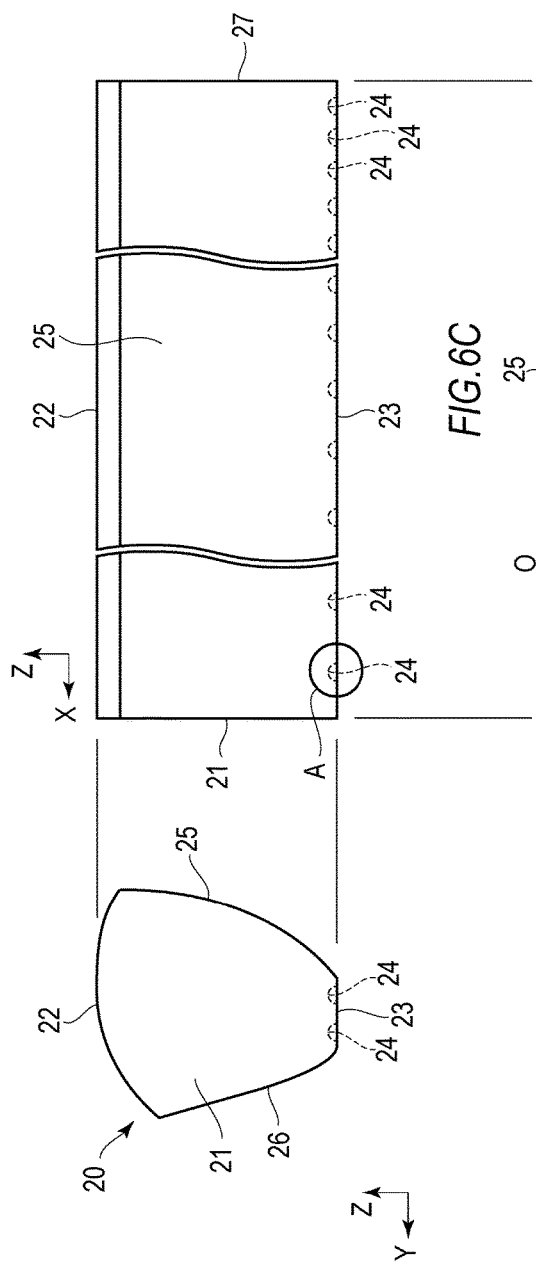

ILLUMINATION APPARATUS, SENSOR UNIT, AND READING APPARATUS

CROSS-REFERENCE TO RELATED APPLICATIONS

This application is based upon and claims the benefit of priority of the prior Japanese Patent Application No. 2016-078130, filed on Apr. 8, 2016, and the Japanese Patent Application No. 2017-073656, filed on Apr. 3, 2017, the entire contents of which are incorporated herein by reference.

BACKGROUND OF THE INVENTION

Field of the Invention

The present invention relates to an illumination apparatus, a sensor unit, and a reading apparatus.

Description of the Related Art

An illumination apparatus that linearly illuminates an illuminated object is known.

An illumination apparatus disclosed in Patent Document 1 includes a light guide that emits, from an emission surface, illumination light incident on an end surface. Recessed spherical surfaces are formed on a bottom surface of the light guide of Patent Document 1.

A light guide disclosed in Patent Document 2 includes concave portions formed on a reflection portion, and peripheral projection portions protruding outward are formed on peripheral portions of the concave portions.

In a light guide disclosed in Patent Document 3, a reflection surface includes reflection concave portions with a plane of polarization.

However, the depth of the recessed spherical surfaces from the bottom surface is small in the light guide of Patent Document 1. Therefore, the light reflected by the bottom surface cannot be scooped up, and it is difficult to diffuse the light emitted from the emission surface in the longitudinal direction of the light guide.

In the light guide of Patent Document 2, a diffuse reflection surface causes the light emitted and diffused from the peripheral projection portions to enter the light guide again, and a light guide holder including the diffuse reflection surface is necessary.

Patent Document 1: U.S. Unexamined Patent Application Publication No. 2006/0165370
Patent Document 2: Japanese Laid-open Patent Publication No. 2014-90403
Patent Document 3: Japanese Laid-open Patent Publication No. 2013-157841

SUMMARY OF THE INVENTION

The present invention has been made in view of the problems, and an object of the present invention is to diffuse light emitted from an emission surface in a longitudinal direction of a light guide.

The present invention provides an illumination apparatus including a light source and an elongated light guide, wherein the light guide includes an emission surface that emits light from the light source and a reflection surface that reflects the light to the emission surface, the reflection surface includes a plurality of diffusion portions that diffuse the light, the diffusion portions have a shape of part of a sphere recessed from the reflection surface, a depth of the diffusion portions from the reflection surface is equal to or greater than 16.5% and equal to or smaller than 50% of a diameter of the sphere, and a width of the diffusion portions in a direction parallel to the reflection surface and orthogonal to a longitudinal direction of the reflection surface is equal to or greater than 0.1 mm and equal to or smaller than 50% of a width of the reflection surface.

The present invention provides a sensor unit including: the illumination apparatus; a light condenser that focuses light reflected after the light is applied to the illuminated object by the illumination apparatus; and a sensor that converts the light focused by the light condenser to an electrical signal.

The present invention provides a reading apparatus including the sensor unit, wherein the sensor unit moves relative to an illuminated object.

BRIEF DESCRIPTION OF THE DRAWINGS

FIGS. 1A, 1B, and 1C are views illustrating a configuration of diffusion portions 24 of a light guide 20 of a first embodiment;
FIGS. 6A, 6B, and 6C are views illustrating a configuration of the light guide 20.

DETAILED DESCRIPTION OF THE PREFERRED EMBODIMENTS

Embodiments of the present invention will now be described in detail with reference to the drawings. The present embodiments provide an illumination apparatus, an image sensor unit (image sensor) 10 to which the illumination apparatus is applied, and an image reading apparatus (reading apparatus) and an image forming apparatus (forming apparatus) to which the image sensor unit 10 is applied. In the image reading apparatus and the image forming apparatus, the image sensor unit 10 emits light to an original P as an illuminated object, and reflected light is converted to an electrical signal to read an image (reflection reading). The illuminated object is not limited to the original P, and other objects to be read, such as a bill, can also be applied. Transmission reading for converting transmitted light transmitted through the original P to an electrical signal to read an image can also be applied.

In the following description, three-dimensional directions will be indicated by arrows of X, Y, and Z. The X direction is a longitudinal direction of a light guide described later and is, for example, a main-scan direction. The Y direction is a sub-scan direction perpendicular to the main-scan direction. The Z direction is a perpendicular direction (vertical direction).

First Embodiment

Figure 2:
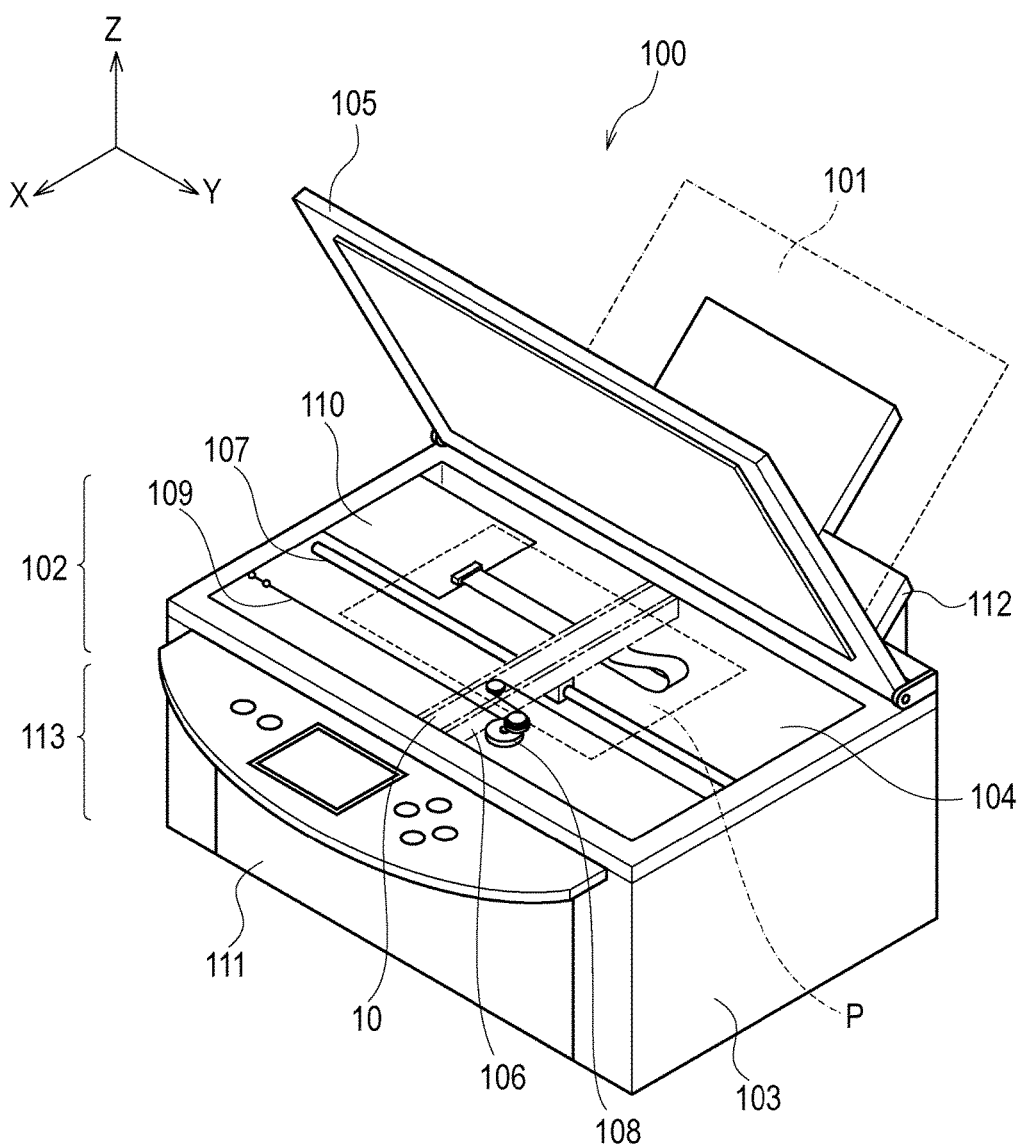
FIG. 2 is a perspective view illustrating an appearance of an MFP 100 including an image sensor unit 10.

A structure of a multi-function printer (MFP) as an example of the image reading apparatus or the image forming apparatus according to the present embodiment will be described with reference to FIG. 2. FIG. 2 is a perspective view illustrating an appearance of an MFP 100. As illustrated in FIG. 2, the MFP 100 includes: an image reading portion 102 as image reading means for reading reflected light from the original P; and an image forming portion 113 as image forming means for forming (printing) an image of the original P on a sheet 101 (recording paper) as a recording medium.

The image reading portion 102 has a function of a so-called image scanner and is configured, for example, as follows. The image reading portion 102 includes: a housing 103; a platen glass 104 as an original placing portion made of a glass transparent plate; and a platen cover 105 that can be freely opened and closed relative to the housing 103 so as to be able to cover the original P.

The housing 103 houses the image sensor unit 10 including the illumination apparatus, a holding member 106, an image sensor unit slide shaft 107, an image sensor unit drive motor 108, a wire 109, a signal processing portion 110, a recovery unit 111, a paper feeding tray 112, and the like.

The image sensor unit 10 is, for example, a contact image sensor (CIS) unit. The holding member 106 surrounds and holds the image sensor unit 10. The image sensor unit slide shaft 107 guides the holding member 106 in the sub-scan direction along the platen glass 104. The image sensor unit drive motor 108 is a movement portion as movement means for relatively moving the image sensor unit 10 and the original P, and specifically, the image sensor unit drive motor 108 moves the wire 109 attached to the holding member 106. The recovery unit 111 can be freely opened and closed relative to the housing 103 and is configured to recover the printed sheet 101. The paper feeding tray 112 houses the sheet 101 in a predetermined size.

In the image reading portion 102 with the configuration described above, the image sensor unit drive motor 108 moves the image sensor unit 10 in the sub-scan direction along the image sensor unit slide shaft 107. In this case, the image sensor unit 10 optically reads the original P placed on the platen glass 104 to convert the light to an electrical signal to perform reading operation of the image.

Figure 3:
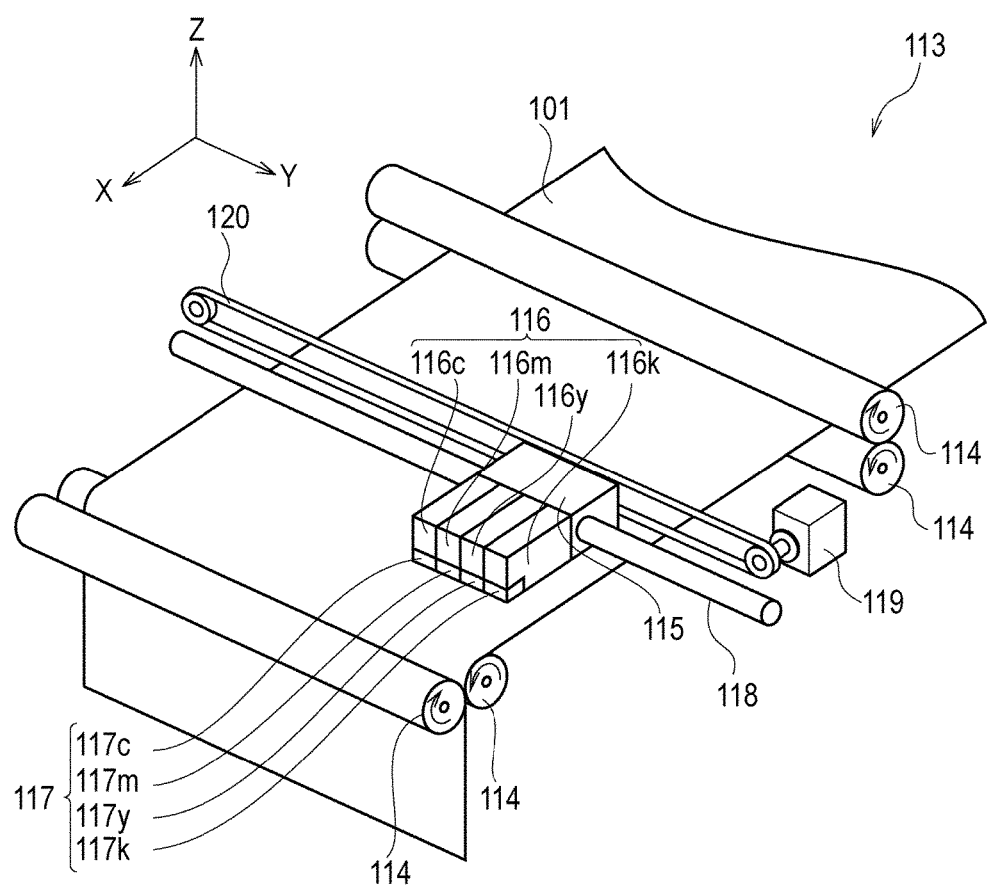
FIG. 3 is a schematic view illustrating a structure of an image forming portion 113 of the MFP 100.

FIG. 3 is a schematic view illustrating a structure of the image forming portion 113.

The image forming portion 113 has a function of a so-called printer and is configured, for example, as follows. The image forming portion 113 is housed in the housing 103 and includes conveyance rollers 114 and a recording head 115 as illustrated in FIG. 3. The recording head 115 includes, for example: ink tanks 116 (116c, 116m, 116y, and 116k) with cyan C, magenta M, yellow Y, and black K inks; and discharge heads 117 (117c, 117m, 117y, and 117k) provided to the ink tanks 116, respectively. The image forming portion 113 also includes a recording head slide shaft 118, a recording head drive motor 119, and a belt 120 attached to the recording head 115.

In the image forming portion 113 with the configuration described above, the conveyance rollers 114 convey the sheet 101 supplied from the paper feeding tray 112 to the recording position. The recording head drive motor 119 mechanically moves the belt 120, and the recording head 115 performs printing on the sheet 101 based on an electrical signal while moving in a printing direction along the recording head slide shaft 118. The operation is repeated until the printing is finished, and the conveyance rollers 114 eject the printed sheet 101 to the recovery unit 111.

Although the inkjet-type image forming apparatus has been described as the image forming portion 113, the type can be any type, such as an electrophotographic type, a thermal transfer type, and a dot impact type.

Figure 4:
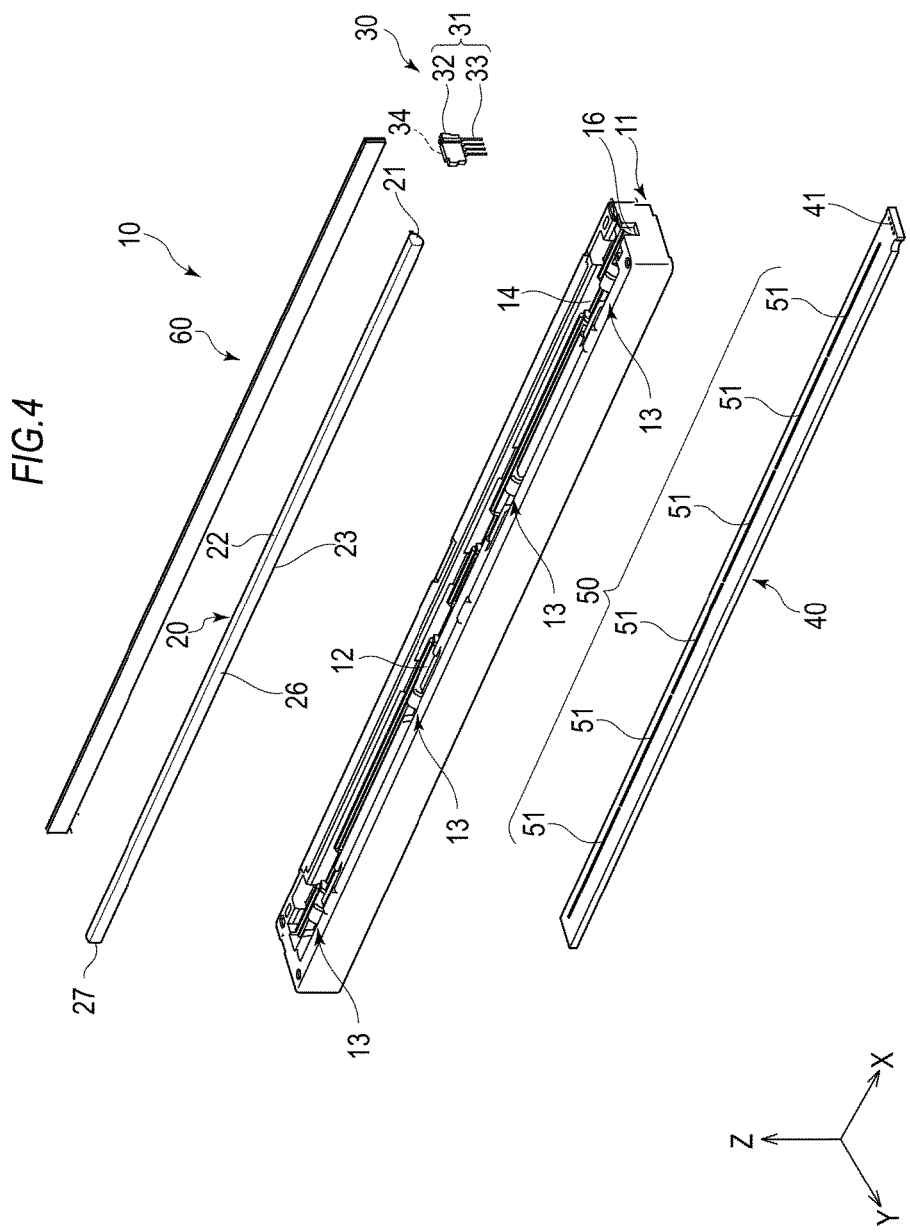
FIG. 4 is an exploded perspective view of the image sensor unit 10.
Figure 5:
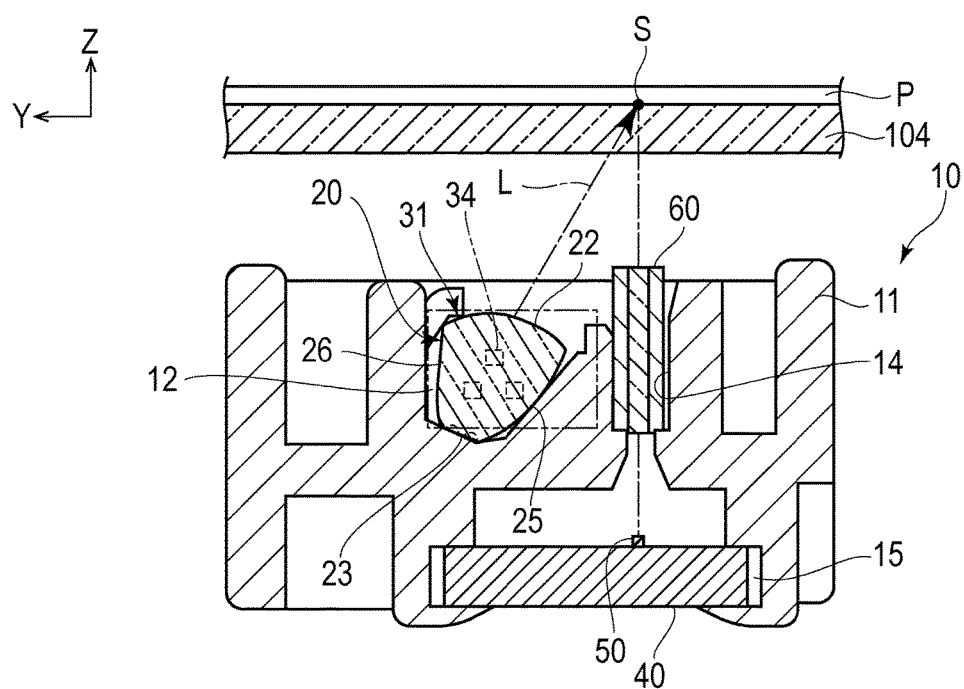
FIG. 5 is a sectional view of the image sensor unit 10.

Next, the image sensor unit 10 of the present embodiment will be described with reference to FIGS. 4 to 6C. FIG. 4 is an exploded perspective view of the image sensor unit 10. FIG. 5 is a sectional view of the image sensor unit 10. FIGS. 6A and 6C are views illustrating a configuration of a light guide described later. FIG. 6A is a view of the light guide 20 in the main-scan direction. FIG. 6B is a side view of the light guide 20. FIG. 6C is a bottom view of the light guide 20.

The image sensor unit 10 includes a frame 11, the light guide 20, a light source 30, a circuit board 40, an image sensor (sensor or line sensor) 50, a light condenser 60, and the like. Among the constituent members, the light source 30 and the light guide 20 function as illumination apparatuses. Among the constituent members described above, the frame 11, the light guide 20, the circuit board 40, the image sensor 50, and the light condenser 60 are formed in lengths according to the dimension in the main-scan direction of the original P to be read.

The frame 11 is a frame that houses the constituent members of the image sensor unit 10 and is formed in a substantially rectangular solid shape with the main-scan direction as a longitudinal direction. The frame 11 is formed by, for example, a light-blocking resin material, such as polycarbonate, colored in black. The reflectance of the surface of the frame 11 here is equal to or lower than 60%, and the frame 11 does not have a function of reflecting light. The reflectance can be obtained from an integrating sphere.

As illustrated in FIG. 5, a light guide housing portion 12 that houses the light guide 20 is formed on the frame 11 in the main-scan direction. As illustrated in FIG. 4, a plurality of holding portions 13 that detachably support the light guide are formed on the light guide housing portion 12 of the frame 11 at intervals in the main-scan direction.

A light condenser housing portion 14 that houses the light condenser 60 is formed on the frame 11 in the main-scan direction, adjacent to the light guide housing portion 12. On the lower surface of the frame 11, a board housing portion 15 for arranging the circuit board 40 is formed in a concave shape from the outside of the frame 11 in the main-scan direction. As illustrated in FIG. 4, a light source housing portion 16 to be provided with the light source 30 is formed on one side of the frame 11 in the main-scan direction.

The light guide 20 guides the light emitted by the light source 30 to the original P and is formed in an elongated shape, specifically, a rod shape, with the main-scan direction as a longitudinal direction. The light guide 20 is positioned by the holding portions 13 of the light guide housing portion 12 of the frame 11 and housed. The light guide 20 is formed by a transparent resin material, such as an acrylic resin and polycarbonate. The reflectance of the surface of the light guide housing portion 12 coming into contact with or facing the light guide 20 is equal to or lower than 60%, like the reflectance of the surface of the frame 11.

As illustrated in FIG. 4, the light guide 20 includes, on one end surface in the main-scan direction, an incident surface 21 that receives the light from the light source 30. The light guide 20 also includes, on the surface facing the original P, an emission surface 22 in a convex curved shape that emits the light incident on the light guide 20 toward the original P. The light guide 20 also includes, on the surface facing the emission surface 22, a planar reflection surface 23 that reflects the light incident on the incident surface 21. Here, the reflection surface 23 forms a first surface, and the emission surface 22 forms a second surface. As illustrated in FIGS. 6A to 6C, a plurality of diffusion portions 24 that diffuse the light incident on the incident surface 21 toward the emission surface 22 are formed in a dot shape on the reflection surface 23. The diffusion portions 24 are formed in a curved shape recessed from the reflection surface 23. Therefore, the diffusion portions 24 have a curved shape convex toward the emission surface 22. The diffusion portions 24 have a curved shape also convex toward the light source 30 arranged on the incident surface 21 side. Specifically, the diffusion portions 24 can have a spherical shape, that is, a shape of part of a sphere. In the diffusion portions 24, peripheral projection portions are not formed on peripheral portions that are boundaries between the diffusion portions 24 and the reflection surface 23, and the diffusion portions 24 are smoothly continuous with the reflection surface 23.

The light incident on the incident surface 21 is reflected by the reflection surface 23 or diffused by the diffusion portions 24, and linear light is emitted to the original P from the emission surface 22. In this case, the diffusion portions 24 have a curved shape convex toward the arranged light source 30. Therefore, the diffusion portions 24 can more easily diffuse the light and can make the light uniform in the width direction of the light guide 20. The diffusion portions 24 have a curved shape convex toward the arranged light source 30, and the diffusion portions 24 can scoop up and reflect the light reflected by the reflection surface 23. The trajectory of the light scooped up and reflected by the diffusion portions 24 will be described later.

The light guide 20 includes a first side surface and a second side surface 26 between the emission surface 22 and the reflection surface 23. The first side surface 25 is formed in a convex curved shape connecting the end of one side of the emission surface 22 and the end of one side of the reflection surface 23. The second side surface 26 is formed in a convex curved shape connecting the end of the other side of the emission surface 22 and the end of the other side of the reflection surface 23. The first side surface 25 and the second side surface 26 function as reflection surfaces for reflecting, in the longitudinal direction of the light guide 20, the light incident on the incident surface 21.

The light guide 20 also includes a planar end surface 27 on the end surface facing the incident surface 21.

The light source 30 emits light to apply the light to the original P through the light guide 20. The light source 30 is connected to the circuit board and housed in the light source housing portion 16 of the frame 11. The light source 30 faces the incident surface 21 of the light guide 20 through a gap when the light source 30 is housed in the frame 11. An LED package 31 is used for the light source 30, for example. The LED package 31 includes a housing 32 formed substantially in a rectangular shape and a plurality of lead terminals 33 protruding from the housing 32. The housing 32 supports a plurality of LED chips 34 as light emitting elements on the surface facing the incident surface 21 of the light guide 20, in a state that the LED chips 34 are sealed by a transparent resin. LED chips with red, green, blue, infrared, and ultraviolet emission wavelengths can be used as the LED chips 34. The reason that the LED chips with infrared and ultraviolet emission wavelengths are used is to read the original P applied with invisible ink for the security.

In FIG. 5, the LED package 31 and the LED chips are illustrated by imaginary lines (alternate long and two short dashes lines) to allow understanding the arrangement of the light source 30 with respect to the light guide 20.

The circuit board 40 is a board for mounting a drive circuit that causes the LED chips 34 to emit light, the image sensor 50, and the like and is formed in a planar shape with the longitudinal direction as a main-scan direction. The circuit board 40 is housed in the board housing portion 15 of the frame 11. A glass epoxy substrate is used for the circuit board 40, for example. Insertion holes for connecting the lead terminals 33 of the LED package 31 are formed on one of the ends of the circuit board 40 in the main-scan direction.

The image sensor 50 receives reflected light reflected from the original P and focused by the condenser 60 and converts the reflected light to an electrical signal. The circuit board 40 is supported by the board housing portion 15 so that the image sensor 50 is arranged on an extension of the optical axis of the light condenser 60. The image sensor 50 is mounted by linearly arranging, in the main-scan direction and on the mounting surface of the circuit board 40, a predetermined number of image sensor ICs 51 including a plurality of light receiving elements (photoelectric conversion elements) according to the resolution of reading of the image sensor unit 10. It is only necessary that the image sensor 50 can convert the reflected light reflected from the original P to an electrical signal, and various well-known image sensor ICs can be used for the image sensor 50.

The light condenser 60 is an optical member that focuses the reflected light from the original P on the image sensor 50 and is formed with the longitudinal direction as a main-scan direction. The light condenser 60 is housed in the light condenser housing portion 14 of the frame 11. The light condenser 60 can be, for example, a rod-lens array with a plurality of imaging elements (rod lenses) of an erect equal magnification imaging type linearly arranged in the main-scan direction. The light condenser 60 is not limited to the rod-lens array as long as the reflected light can be focused on the image sensor 50, and an optical member with various well-known light condensing functions, such as a micro-lens array, can be used.

As illustrated in FIG. 5, the image sensor unit with the configuration described above causes the light source 30 arranged in the frame 11 to emit light to apply the light from the light guide 20 to the lower surface of the original P as indicated by an arrow L. Therefore, the light is linearly applied to the original P throughout a reading line S (main-scan direction). The light is reflected by the original P, and the reflected light is focused on the image sensor 50 through the light condenser 60. The image sensor 50 can convert the focused reflected light to an electrical signal to read the image on the lower surface of the original P.

The image sensor 50 reads the reflected light of one scan line to complete the reading operation of one scan line in the main-scan direction of the original P. After the reading operation of one scan line is finished, the reading operation of next one scan line is performed as in the operation described above along with relative movement of the image sensor unit 10 in the sub-scan direction. In this way, the image sensor unit 10 repeats the reading operation of one scan line while moving in the sub-scan direction to successively scan the entire surface of the original P to read the image based on the reflected light.

Next, a configuration of the diffusion portions 24 of the light guide 20 will be described in detail.

As illustrated in FIG. 6C, the plurality of diffusion portions 24 are arranged throughout the entire surface of the reflection surface 23. Specifically, the density of the diffusion portions is small on the incident surface 21 side, and the density is large on the end surface 27 side. Therefore, the density of the diffusion portions 24 with respect to the reflection surface 23 gradually increases toward the end surface 27 side from the incident surface 21 side on the reflection surface 23.

The incident surface 21 side is close to the light source 30, and a large amount of light reaches from the light source 30. Because a large amount of light reaches, the density of the diffusion portions is small on the incident surface 21 side to diffuse the reached light in a small amount, and a desired amount of light is emitted from the emission surface 22 on the incident surface 21 side. On the other hand, the end surface 27 side is far from the light source 30, and a small amount of light reaches from the light source 30. Because a small amount of light reaches, the density of the diffusion portions is increased on the end surface 27 side to diffuse the reached light in a larger amount, and a desired amount of light is emitted from the emission surface 22 on the end surface 27 side.

The diffusion portions 24 are arranged on the reflection surface 23 according to a regular pattern. More specifically, as illustrated in FIG. 6C, two diffusion portions 24 (diffusion portion 24a and diffusion portion 24b) arranged at a distance in the width direction (direction orthogonal to the longitudinal direction) of the reflection surface 23 form one set, and the intervals between the sets are reduced toward the end surface 27 side from the incident surface 21 side in arranging the diffusion portions 24. The distance between the diffusion portion 24a and the diffusion portion 24b is the same in any of the sets.

Center points of any two adjacent diffusion portions 24 in the longitudinal direction of the reflection surface 23 (for example, the diffusion portion 24a and the diffusion portion 24a) do not overlap as viewed in the longitudinal direction, and the two adjacent diffusion portions 24 are displaced in the width direction. Therefore, the light incident on the incident surface 21 side reaches all of the diffusion portions 24 without being blocked by the diffusion portions 24 in front, and the diffusion efficiency of the diffusion portions 24 can be improved.

The light guide 20 as described above can be manufactured by injection molding using a die. More specifically, an acrylic resin, polycarbonate, or the like as a raw material of the light guide 20 is melted and injected into the die, and then the raw material is cooled to manufacture the light guide 20. An electrode in the same shape as the light guide 20 is used to create the die by electrical discharge machining. While the die has projections and recesses opposite the light guide 20, the electrode has the same projections and recesses as the light guide 20. Therefore, the shape of the electrode equivalent to the diffusion portions 24 can also be spherical. Thus, a spherical tool can be used to cut the electrode to easily create the shape equivalent to the diffusion portions 24.

In the light guide 20 of the present embodiment, the depth, the width, and the number of diffusion portions 24 can be defined in predetermined ranges to obtain advantageous effects that cannot be expected in conventional light guides. The depth, the width, and the number of diffusion portions 24 will be specifically described below.

<Depth of Diffusion Portions>

The depth of the diffusion portions 24 of the present embodiment is formed as follows to allow diffusing not only the light directly reaching from the light source 30, but also the light reflected by the reflection surface 23.

FIG. 1A is a sectional view of the diffusion portion 24 and is an enlarged sectional view of a section A illustrated in FIG. 6B. All of the plurality of diffusion portions 24 have the same shape, and the other diffusion portions 24 will not be described.

The diffusion portion 24 of the present embodiment has a spherical shape recessed toward the inside of the light guide 20 from the reflection surface 23. The depth of the position farthest from the reflection surface 23 is increased in the diffusion portion 24 to realize a shape close to a hemispherical shape.

Here, as illustrated in FIG. 1A, Di represents the diameter of the spherical shape of the diffusion portion 24 (circle including an alternate short and long dash line and a solid line), and De represents the depth of the diffusion portion 24. For example, the light guide 20 including the diffusion portions can be manufactured, wherein the diameter Di is 0.19 mm, and the depth De is 0.09 mm. In this case, the depth De of the diffusion portions 24 is 47.3% of the diameter Di of the spherical shape. Here, when, for example, the depth De is 50% of the diameter Di of the spherical shape of the diffusion portion 24, the diffusion portion 24 is completely hemispherical. On the other hand, when the depth De is close to 0% of the diameter Di of the spherical shape of the diffusion portion 24, the depth De is close to 0 mm.

A laser microscope VK-X100 of Keyence is used as a measurement device in measuring the diameter Di of the spherical shape of the diffusion portion 24 and the depth De, and an analysis application VK-H1XA of Keyence is used as software. As for the measurement conditions, the objective lens is 20×, the measurement mode is surface shape, and the measurement pitch is 0.2 μm.

To measure the diameter Di of the spherical shape of the diffusion portion 24 and the depth De, a cut shape is derived by cutting the shape of the diffusion portion 24 observed by the measurement device, along a plane passing through the deepest position of the diffusion portion 24 and orthogonal to the reflection surface 23. In this case, two cut shapes are derived, a cut shape in the longitudinal direction of the light guide 20 and a cut shape in the direction orthogonal to the longitudinal direction. Three arbitrary points are then selected for each cut shape, and virtual circles passing through the three selected points are set. A plurality of virtual circles are set for each cut shape, and an average diameter of all of the set virtual circles is set as the diameter Di of the spherical shape of the diffusion portion 24. The depth of the selected three points is equal to or greater than a certain depth from the reflection surface 23 (for example, 30 μm) to prevent a reduction in the accuracy of the virtual circles. The distance from the reflection surface 23 to the deepest position in the shape of the diffusion portion 24 observed by the measurement device is set as the depth De of the diffusion portion 24.

Although the depth Dc of the diffusion portion 24 of the present embodiment is 50% of the diameter Di of the spherical shape, it is preferable that the depth De is equal to or greater than 16.5% and equal to or smaller than 50% of the diameter Di of the spherical shape.

When the depth De of the diffusion portion 24 is 16.5%, the reflection surface 23 of the light guide is as indicated by an alternate long and two short dashes line F illustrated in FIG. 1A. The depth 16.5% of the diffusion portion 24 provides a critical angle with which light B applied parallel to the diffusion portion 24 along the alternate long and two short dashes line F is reflected by the diffusion portion 24 without the light passing through the diffusion portion 24, as illustrated in FIG. 1A. Therefore, even when, for example, light C is applied to a part where the depth of the diffusion portion 24 is equal to or greater than 16.5%, the light C is not reflected by the diffusion portion 24. The light C passes through the light guide 20, and this does not contribute to the diffusion of the light. Therefore, the designer usually does not consider setting the depth of the diffusion portion 24 to a depth equal to or greater than 16.5%. On the other hand, the depth De of the diffusion portion 24 is deliberately set to a depth equal to or greater than 16.5% in the present embodiment to increase the depth De of the diffusion portion 24, and the light reflected by the reflection surface 23 can be diffused as described later. On the other hand, the depth of the diffusion portion 24 is set to a depth equal to or smaller 50%, and the diffusion portion 24 can be easily processed and molded.

It is further preferable that the depth De of the diffusion portion 24 is equal to or greater than 35% and equal to or smaller than 50% of the diameter Di of the spherical shape.

The reason that the depth De of the diffusion portion 24 is equal to or greater than 35% is that the depth De of the diffusion portion 24 may become equal to or greater than 35% due to the variability of processing when the diffusion portion 24 is manufactured such that the depth De of the diffusion portion 24 is 50% of the diameter Di of the spherical shape.

Next, diffusion of light using a light guide 70 in which the depth De of a diffusion portion 74 is out of the defined range in a first example and diffusion of light using the light guide 20 in which the depth D of the diffusion portion 24 is within the defined range (50%) in a second example will be described.

Figure 7A:
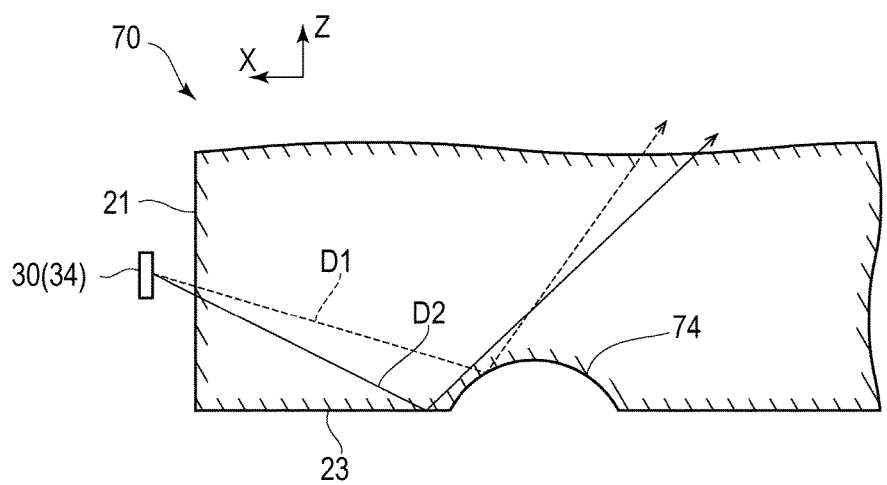
FIG. 7A is a view illustrating diffusion by a diffusion portion 74 of a first example.

FIG. 7A is a view illustrating the diffusion in the first example. As illustrated in FIG. 7A, light D1 applied near the apex of the diffusion portion 74 in the light from the light source 30 is reflected by the diffusion portion 74, and the light D1 advances in the longitudinal direction of the light guide 70. Light D2 applied in front of the diffusion portion 74, that is, on the reflection surface 23 on the light source 30 side, in the light from the light source 30 also advances in the longitudinal direction of the light guide 70. Therefore, both the light D1 and the light D2 advance in the same direction.

Figure 7B:
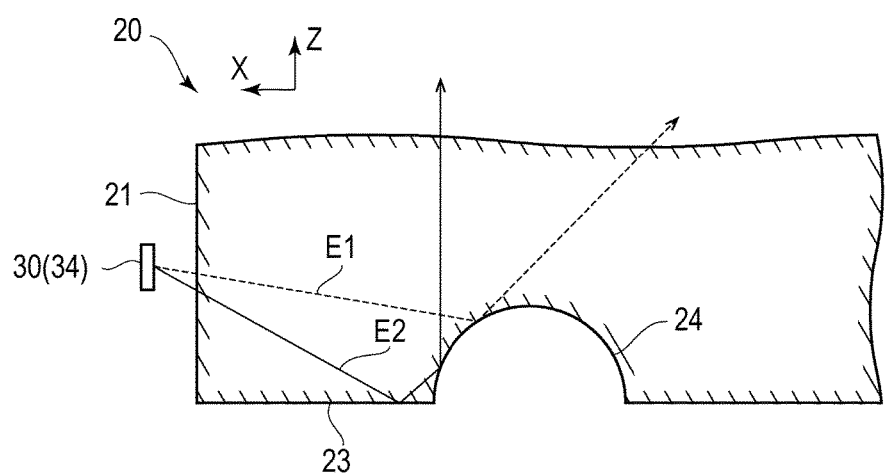
FIG. 7B is a view illustrating diffusion by the diffusion portion 24 of a second example.

FIG. 7B is a view illustrating the diffusion in the second example. As illustrated in FIG. 7B, light E1 applied near the apex of the diffusion portion 24 in the light from the light source 30 is reflected by the diffusion portion 24, and the light E1 advances in the longitudinal direction of the light guide 20. On the other hand, light E2 applied in front of the diffusion portion 24, that is, on the reflection surface 23 on the light source 30 side, in the light from the light source 30 is reflected by a surface of the diffusion portion 24 with a large inclination angle rising toward the reflection surface 23, and the light E2 is diffused in a direction different from the light E1. Here, the light reflected by the diffusion portion 24 advances substantially above the diffusion portion 24.

In this way, the depth De of the diffusion portion 24 can be set to equal to or greater than 16.5% and equal to or smaller than 50% of the diameter Di of the sphere and can be further set to equal to or greater than 35% and equal to or smaller than 50% of the diameter Di of the sphere to increase the depth De of the diffusion portion 24. The inclination angle of the surface rising toward the reflection surface 23 formed on the diffusion portion increases with an increase in the depth De of the diffusion portion 24. The surface of the diffusion portion 24 with a large inclination angle scoops up and reflects the light reflected by the reflection surface 23 in the light from the light source 30, and the light can be diffused in a direction different from the other light.

<Width of Diffusion Portions>

Next, the width of the diffusion portions 24 of the present embodiment is formed as follows to maintain the accuracy of the spherical shape and to improve the diffusion efficiency.

FIG. 1B is a view illustrating an example of the diffusion portions 24 arranged on the reflection surface 23.

Here, as illustrated in FIG. 1B, Wr represents the width of the reflection surface 23 of the light guide 20, and Wd represents the width of the diffusion portions 24. The width denotes a direction orthogonal to the longitudinal direction of the light guide 20 and parallel to the reflection surface 23. For example, in the same case as the embodiment described above, the light guide 20 can be manufactured, wherein the width Wr of the reflection surface 23 is 0.98 mm, and the width Wd of the diffusion portions 24 is 0.19 mm.

Note that in the measurement of the width Wd of the diffusion portions 24, the measurement device, the software, and the measurement conditions are the same as in the case of measuring the diffusion portions 24.

To measure the width Wd of the diffusion portion 24, a cut shape is derived by cutting the diffusion portion 24 along a plane passing through the deepest position of the diffusion portion 24, the plane orthogonal to the reflection surface 23 and parallel to the width direction. Next, three arbitrary points are selected on the cut shape, and virtual circles passing through the three selected points are set. A plurality of virtual circles are set, and a distance between two points where the virtual circle and the surface of extension of the reflection surface 23 intersect is measured for all of the set virtual circles. An average distance of the distances is set as the width Wd of the diffusion portion 24. When the boundary of the first side surface 25 and the reflection surface 23 or the boundary of the second side surface 26 and the reflection surface 23 is trimmed in the measurement of the width of the reflection surface 23, the boundaries without the trimming are the start point and the end point of the measurement.

In the present embodiment, it is preferable that the width Wd of the diffusion portion 24 is equal to or greater than 0.1 mm. The diffusion portion 24 can be easily processed and molded when the width Wd of the diffusion portion 24 is equal to or greater than 0.1 mm. This is particularly preferable when a die is used to manufacture the light guide 20 by injection molding, and more specifically, this is preferable when an electrode is used to create the die by electrical discharge machining.

It is preferable in the present embodiment that the width Wd of the diffusion portion 24 is equal to or smaller than 50% of the width Wr of the reflection surface 23. The reason that the width Wd of the diffusion portion 24 is equal to or smaller than 50% of the width Wr of the reflection surface 23 is that only one diffusion portion 24 can be arranged in the width direction of the reflection surface 23 if the width Wd is greater than 50%. The efficiency of diffusing the light from the light source 30 can be improved by arranging at least two diffusion portions in the width direction of the reflection surface 23.

It is further preferable that the width Wd of the diffusion portion 24 is equal to or greater than 15% and equal to or smaller than 30% of the width Wr of the reflection surface 23. The reason that the width Wd of the diffusion portion 24 is equal to or smaller than 30% of the width Wr of the reflection surface 23 is to allow arranging three or more diffusion portions 24 in the width direction of the reflection surface 23. Therefore, the efficiency of the diffusion of light from the light source 30 can be further improved by arranging three or more diffusion portions 24 in the width direction of the reflection surface 23. On the other hand, the reason that the width Wd of the diffusion portion 24 is equal to or greater than 15% of the width Wr of the reflection surface 23 is to arrange five or less diffusion portions 24 in the width direction of the reflection surface 23. More specifically, arranging six or more diffusion portions 24 in the width direction of the reflection surface 23 requires a large number of steps and increases the manufacturing cost. Particularly, when a die is used to manufacture the light guide 20 by injection molding, the manufacturing cost increases if small spherical shapes equivalent to the diffusion portions 24 are processed one by one for an electrode when the electrode is used to create the die by electrical discharge machining.

Note that the shape of the intersection of a virtual sphere corresponding to the curved surface of the diffusion portion 24 and the surface of the reflection surface 23 is a circle. Therefore, the width of the diffusion portion 24 is the same as the diameter of the circle of the intersection of the virtual sphere of the diffusion portion 24 and the reflection surface 23.

<The Number of Diffusion Portions>

Next, the number of diffusion portions 24 of the present embodiment is as follows in order to improve the diffusion efficiency and reduce the manufacturing cost of the light guide 20.

In the present embodiment, it is preferable that two or more and five or less diffusion portions 24 are linearly arranged in the width direction. Here, the reason that two or more diffusion portions 24 are linearly arranged in the width direction is that the efficiency of diffusing the light from the light source 30 can be improved by arranging two diffusion portions 24 in the width direction of the reflection surface 23.

The reason that five or less diffusion portions are arranged in the width direction is that arranging six or more diffusion portions 24 in the width direction of the reflection surface 23 requires a large number of processes and increases the manufacturing cost. FIG. 1C illustrates the light guide 20 including five diffusion portions 24 linearly arranged in the width direction.

In this way, according to the present embodiment, the depth of the diffusion portion 24 from the reflection surface 23 is equal to or greater than 16.5% and equal to or smaller than 50% of the diameter of the spherical shape. Therefore, the diffusion portion 24 scoops up and reflects the light reflected by the reflection surface 23 in the light emitted from the light source 30, and the light emitted from the emission surface 22 of the light guide 20 can be diffused in the longitudinal direction of the light guide 20.

According to the present embodiment, the width of the diffusion portion 24 is equal to or greater than 0.1 mm and equal to or smaller than 50% of the width of the reflection surface 23. Therefore, the shape of the diffusion portion 24 can be easily processed or molded.

When the diffusion portion 24 is spherical, the shape of the diffusion portion 24 appeared on the surface of the reflection surface 23 is a circle. It is preferable here that the diffusion portion 24 has a spherical shape such that the curvature of the circle of the diffusion portion 24 appeared on the reflection surface 23 is 1.5 to 20. The diameter of the circle is 1.33 mm when the curvature is 1.5, and the diameter of the circle is 0.1 mm when the curvature is 20. Defining such a range can improve the efficiency of duffing the light from the light source 30 in the width direction. The same measurement method as in the measurement of the width Wd of the diffusion portion 24 can be applied to measure the diameter of the circle. Therefore, the width Wd of the diffusion portion 24 is the diameter of the circle of the diffusion portion 24 appeared on the reflection surface 23 when the diffusion portion is spherical. Note that the range of the manufacturing error is included in the concept of the circle even if all or part of the circle is distorted.

Second Embodiment

Figure 8A:
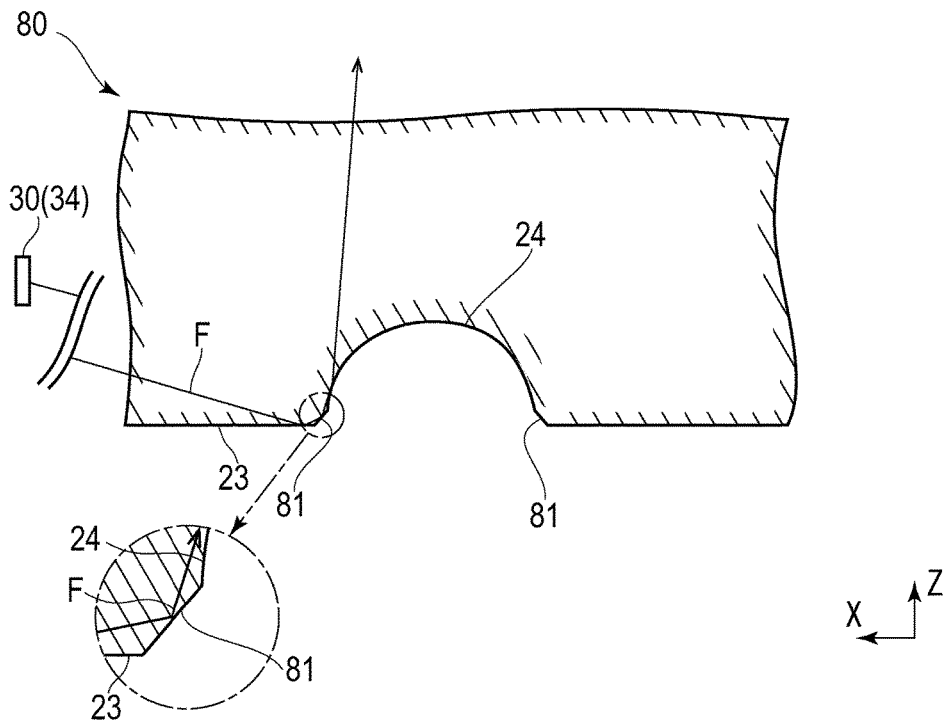
FIG. 8A is a view illustrating a configuration of the diffusion portion 24 of a second embodiment.

FIG. 8A is an enlarged sectional view illustrating the diffusion portion 24 of a light guide 80 of a second embodiment. The same reference signs are provided to the same components as in the first embodiment, and the description will not be repeated.

The light guide 80 of the present embodiment includes inclined portions 81 throughout the boundaries of the reflection surface 23 and the diffusion portions 24. In this way, the inclined portions 81 are provided, and the inclined portions and the diffusion portion 24 can scoop up and reflect the light applied substantially parallel to the reflection surface 23 in the light from the light source 30. More specifically, as illustrated in an enlarged view of an alternate short and long dash line of FIG. 8A, light F applied in front of the diffusion portion 24, that is, on the reflection surface 23 on the light source 30 side, in the light from the light source 30 is reflected by the inclined portion 81 and further reflected by the diffusion portion 24. Therefore, the light reflected by the reflection surface 23 in the light from the light source 30 is scooped up and reflected, and the light can be diffused in a direction different from the other light.

In this way, in the light guide 80 of the present embodiment, the diffusion portions 24 are recessed from the reflection surface 23, and the light guide includes the inclined portions 81 on the boundaries of the reflection surface 23 and the diffusion portions 24.

Although the inclined portions 81 are linear in the case described in the present embodiment, the shape is not limited to this, and the shape of the inclined portions 81 may be a curved shape. Furthermore, the shape of the diffusion portions 24 is not limited to the spherical shape.

Next, a case in which the inclined portions are curved will be described.

Figure 8B:
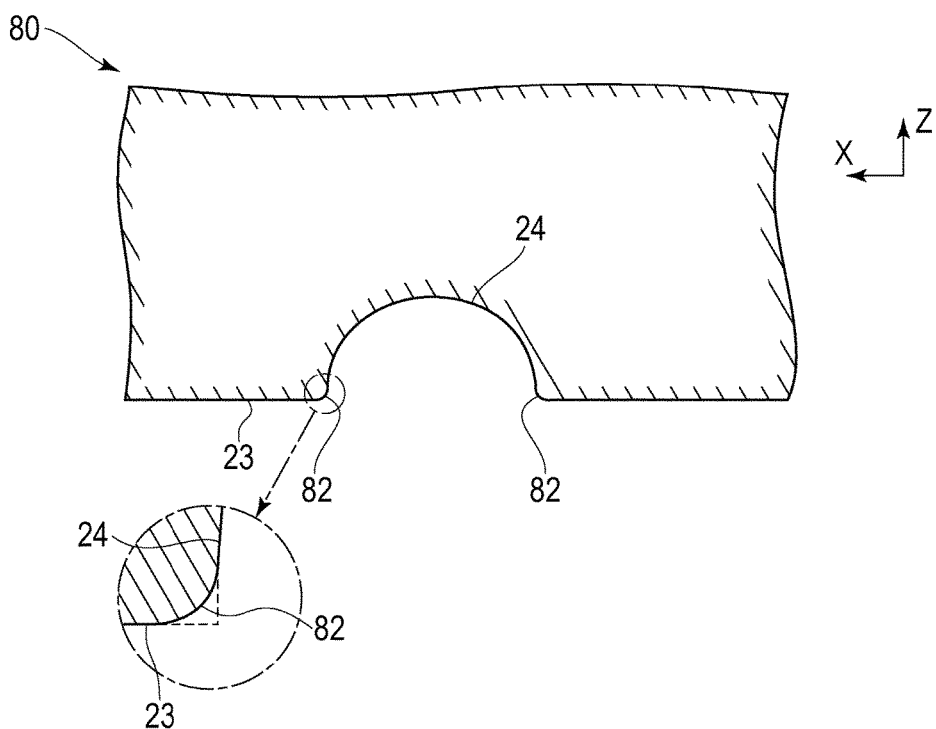
FIG. 8B is a view illustrating a configuration of the diffusion portion 24 of the second embodiment.

FIG. 8B is an enlarged sectional view of the diffusion portion 24 including curved inclined portions 82.

The inclined portions 82 have a shape in which corners of the diffusion portions 24 are rounded off on the reflection surface 23. Here, when the shape of the diffusion portion 24 is geometrically approximated as a circumference of a circle, an opening wider than the opening of the approximated circle is obtained on the reflection surface 23 side. The approximated circumference of the circle is indicated by a dashed line in an enlarged view of an alternate short and long dash line of FIG. 8B.

The shapes of the inclined portions 81 and 82 described above can be obtained by trimming. Alternatively, the shapes of the inclined portions 81 and 82 can be obtained by transferring the shapes of inclined portions of the dies. Note that the shape of the inclined portions of the die can be obtained based on the shape of the electrode used in electrical discharge machining. To remove small unevenness of projection portions corresponding to concave portions of the light guide 80, the surface for molding including the projection portions is polished in the electrode subjected to electrical discharge machining.

The shapes of the inclined portions 81 and 82 are preferable shapes, because the light guide can be easily removed from the die when the light guide 80 is molded by the die. The shapes are particularly preferable when the small light guide 80 including a plurality of dot-shaped fine concave portions is molded by the die as in the present embodiment.

The same measurement device, software, and measurement conditions as in the measurement of the diffusion portion 24 can be set to observe the inclined portions 81 and 82.

Although the shape of the diffusion portion 24 is spherical in the description of the first and second embodiments as described above, it is only necessary that the shape of the diffusion portion 24 is a curved shape, and the shape can be, for example, elliptical.

It is preferable that the diffusion portion 24 that is a concave portion provided on the reflection surface 23 of the light guide 20 has a curved shape convex not only toward the emission surface 22, but also toward the arranged light source 30 in order to more easily diffuse the light and make the light uniform in the width direction of the light guide 20. A curved shape, such as a spherical shape and an elliptical shape, is preferable as a shape satisfying both the curved shape convex toward the emission surface 22 and the curved shape convex toward the light source 30.

The diffusion portion according to the present invention may be elliptical instead of the spherical diffusion portion 24 described in the present embodiment or the second embodiment. The fact that the diffusion portion may be spherical or elliptical denotes that the diffusion portion has a curved shape recessed from the reflection surface 23. The diffusion portion according to the present invention is curved and convex toward the light source 30 on the reflection surface, like a circular shape or an elliptical shape. Therefore, the diffusion portion according to the present invention is curved in the depth direction from the reflection surface 23 (Z direction in FIGS. 1A to 1C) and in the width direction of the reflection surface 23 (Y direction in FIGS. 1A to 1C).

The size in the depth direction and the size in the width direction of the diffusion portion can be obtained from the virtual circles set at the deepest location observed by the laser microscope. The numerical range of the depth of the diffusion portion in that case is the same as the numerical range described above, that is, equal to or greater than 16.5% and equal to or smaller than 50% of the virtual circle. The width of the diffusion portion is also equal to or greater than 0.1 mm and equal to or smaller than 50% of the width of the reflection surface 23.

Third Embodiment

Next, a configuration in which the image sensor unit 10 is applied to a flat-bed type scanner 130 as an image reading apparatus will be described with reference to FIG. 9.

Figure 9:
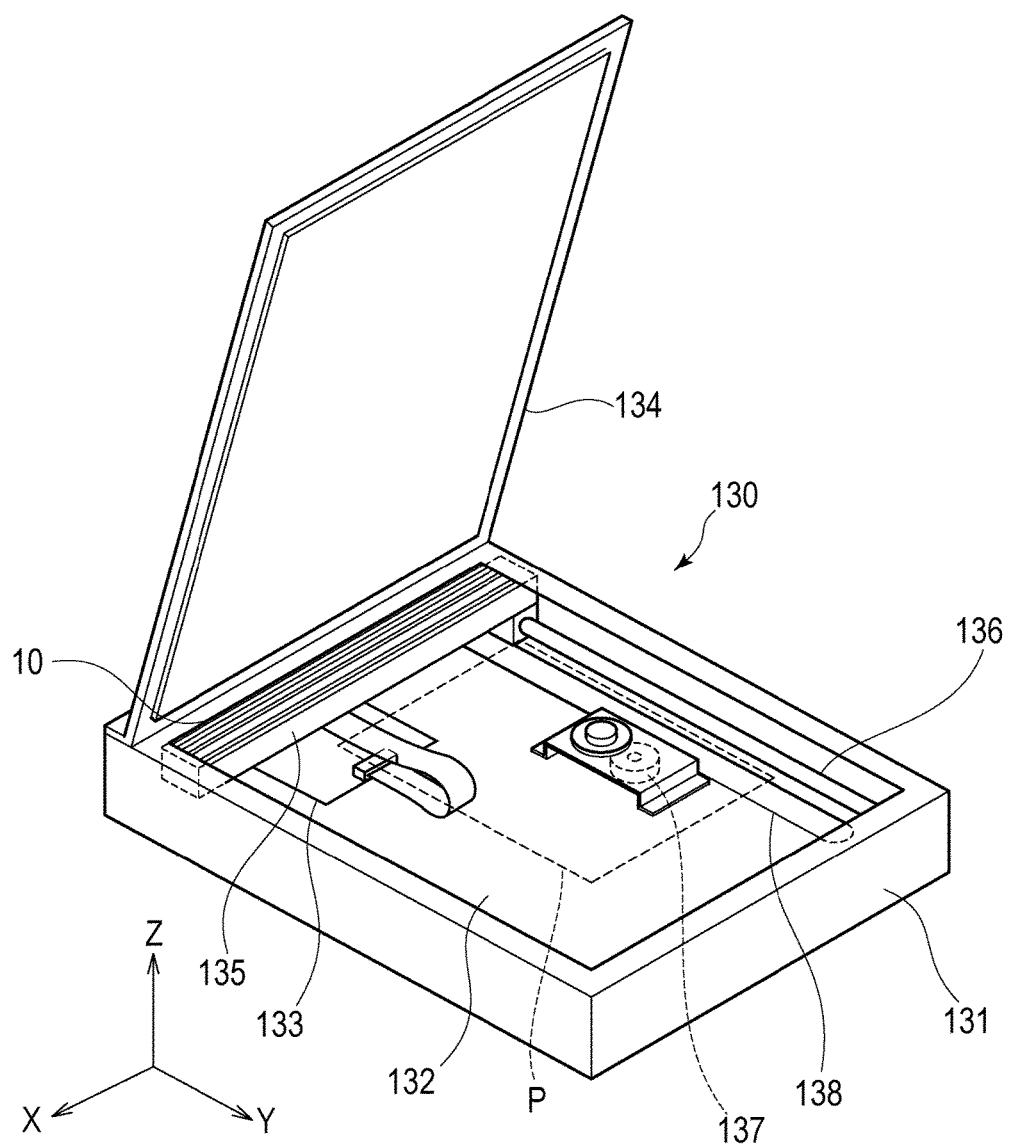
FIG. 9 is a perspective view illustrating an example of a configuration of a flat-bed type scanner.

FIG. 9 is a perspective view illustrating an example of the configuration of the flat-bed type scanner 130.

The scanner 130 includes a housing 131, a platen glass 132 as an illuminated object placing portion, the image sensor unit 10, a driving mechanism that drives the image sensor unit 10, a circuit board 133, and a platen cover 134. The platen glass 132 is made of a transparent plate, such as glass, and is attached to the upper surface of the housing 131. The platen cover 134 is attached to the housing 131 through a hinge mechanism or the like so as to cover the original P placed on the platen glass 132, and the platen cover 134 can be opened and closed. The image sensor unit 10, the driving mechanism that drives the image sensor unit 10, and the circuit board 133 are housed in the housing 131.

The driving mechanism includes a holding member 135, a guide shaft 136, a drive motor 137, and a wire 138. The holding member 135 surrounds and holds the image sensor unit 10. The guide shaft 136 guides the holding member 135 to allow the holding member 135 to move in the reading direction (sub-scan direction) along the platen glass 132. The drive motor 137 and the holding member 135 are coupled through the wire 138 and move the holding member 135 holding the image sensor unit 10 in the sub-scan direction based on the driving force of the drive motor 137. The image sensor unit 10 reads the original P placed on the platen glass 132 while moving in the sub-scan direction based on the driving force of the drive motor 137. In this way, the original P is read, while the image sensor unit 10 and the original P are relatively moved.

An image processing circuit that applies predetermined image processing to the image read by the image sensor unit 10, a control circuit that controls each unit of the scanner 130 including the image sensor unit 10, a power circuit that supplies power to each unit of the scanner 130, and the like are constructed on the circuit board 133.

Fourth Embodiment

Next, a configuration in which the image sensor unit 10 is applied to a sheet-feed type scanner 140 as an image reading apparatus will be described with reference to FIG. 10.

Figure 10:
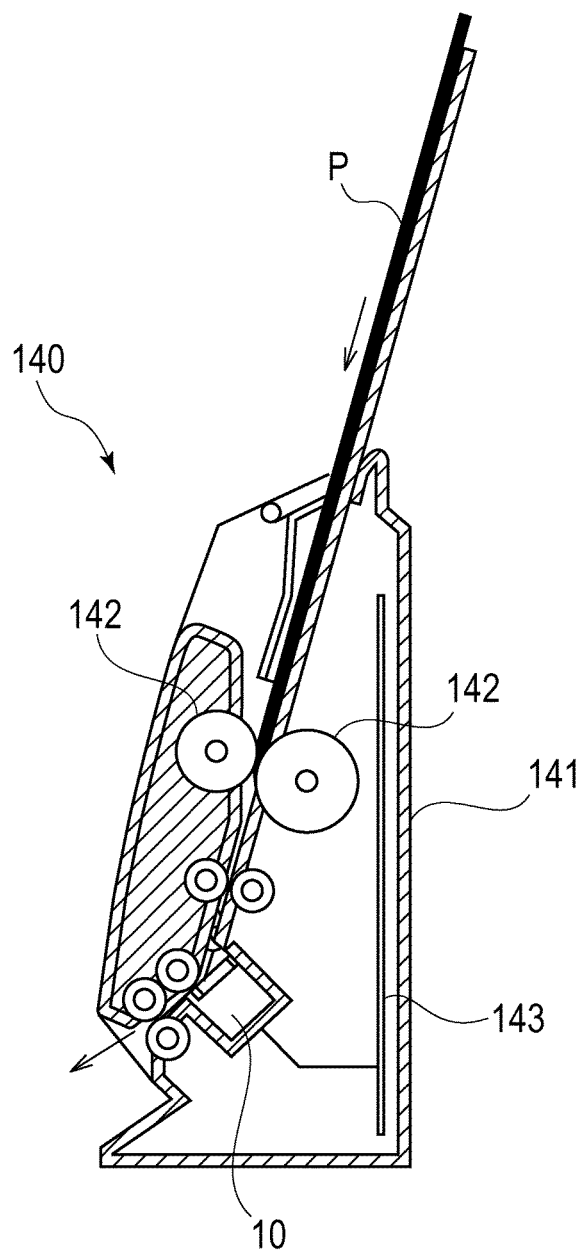
FIG. 10 is a sectional view illustrating an example of a configuration of a sheet-feed type scanner.

FIG. 10 is a sectional view illustrating an example of the configuration of the sheet-feed type scanner 140.

The scanner 140 includes a housing 141, the image sensor unit 10, conveyance rollers 142, and a circuit board 143. A driving mechanism not illustrated rotates the conveyance rollers 142, and the original P is conveyed between the conveyance rollers 142. A control circuit that controls each unit of the scanner 140 including the image sensor unit 10, a power circuit that supplies power to each unit of the scanner 140, and the like are constructed on the circuit board 143.

In the scanner 140, the image sensor unit 10 reads the original P, while the conveyance rollers 142 convey the original P in the reading direction (sub-scan direction). Therefore, the original P is read, while the image sensor unit 10 and the original P are relatively moved. Although FIG. 10 illustrates an example of the scanner 140 that reads one side of the original P, two image sensor units 10 facing each other across the conveyance path of the original P may be provided to read both sides of the original P.

Although the present invention has been described based on the embodiments, the present invention is not limited to the embodiments, and changes can be made within the scope of the present invention.

Although the diffusion portions 24 are arranged on the reflection surface 23 according to a regular pattern in the embodiments, the arrangement is not limited to this, and the diffusion portions 24 may be irregularly arranged. In this case, the density of the diffusion portions 24 with respect to the reflection surface 23 can be gradually increased toward the end surface 27 side from the incident surface 21 side on the reflection surface 23, and a desired amount of light can be emitted from the emission surface 22, from any position of the light guide 20 in the longitudinal direction.

Although the light guide 20 includes reflection surfaces, such as the first side surface 25 and the second side surface 26, in the description of the embodiments, the arrangement is not limited to this, and the light guide 20 may include other reflection surfaces.

Although the light guide 20 has a linear shape continuous in the longitudinal direction from the incident surface 21 to the end surface 27 in the description of the embodiments, the arrangement is not limited to this, and a light guide including a curved portion may also be used. Specifically, the light guide can include: a light emitting portion formed in a rod shape that is long in the main-scan direction; and a curved portion curved from the end of one side of the light emitting portion. In this case, the end surface of the curved portion can be an incident surface that receives the light from the light source 30, and a surface-mount LED package can be provided in which the light source 30 is mounted on the surface of the circuit board 40.

Although the light guide 20 manufactured by injection molding suitable for mass production is described in the embodiments, the arrangement is not limited to this, and the light guide 20 may be manufactured by a cutting process suitable for low-volume production.

Note that at least one of the image sensor unit and the original P may be relatively moved by the movement portion.

According to the present invention, the light emitted from the emission surface can be diffused in the longitudinal direction of the light guide.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An illumination apparatus comprising:
    a light source; and
    an elongated light guide, wherein:
    the light guide comprises an emission surface that emits light from the light source and a reflection surface that reflects the light to the emission surface,
    the reflection surface comprises a plurality of diffusion portions that diffuse the light,
    the diffusion portions have a shape of part of a sphere recessed from the reflection surface,
    a depth of each of the plurality of the diffusion portions from the reflection surface is equal to or greater than 16.5% of a diameter of the sphere and equal to or smaller than 50% of the diameter of the sphere, and
    a width of each of the plurality of the diffusion portions in a direction parallel to the reflection surface and orthogonal to a longitudinal direction of the light guide is equal to or greater than 0.1 mm and equal to or smaller than 50% of a width of the reflection surface.

2. The illumination apparatus according to claim 1, wherein
    the depth of each of the plurality of the diffusion portions from the reflection surface is equal to or greater than 35% of the diameter of the sphere and equal to or smaller than 50% of the diameter of the sphere.

3. The illumination apparatus according to claim 1, wherein
    the width of the diffusion portions is equal to or greater than 15% of the width of the reflection surface and equal to or smaller than 30% of the width of the reflection surface.

4. The illumination apparatus according to claim 1, wherein
    two to five diffusion portions are linearly arranged in the width direction of the reflection surface.

5. The illumination apparatus according to claim 1, wherein
    the light guide comprises inclined portions at boundaries of the reflection surface and the diffusion portions.

6. The illumination apparatus according to claim 1, wherein center points of any two diffusion portions immediately adjacent in the longitudinal direction of the light guide do not overlap such that the any two immediately adjacent diffusion portions are displaced in a width direction of the reflection surface.

7. A sensor unit comprising:
    an illumination apparatus;
    a light condenser that focuses light reflected after the light is applied to an illuminated object by the illumination apparatus; and
    a sensor that converts the light focused by the light condenser to an electrical signal, wherein:
    the illumination apparatus comprises a light source and an elongated light guide,
    the light guide comprises an emission surface that emits light from the light source and a reflection surface that reflects the light to the emission surface,
    the reflection surface comprises a plurality of diffusion portions that diffuse the light,
    the diffusion portions have a shape of part of a sphere recessed from the reflection surface,
    a depth of each of the plurality of the diffusion portions from the reflection surface is equal to or greater than 16.5% of a diameter of the sphere and equal to or smaller than 50% of the diameter of the sphere, and
    a width of each of the plurality of the diffusion portions in a direction parallel to the reflection surface and orthogonal to a longitudinal direction of the light guide is equal to or greater than 0.1 mm and equal to or smaller than 50% of a width of the reflection surface.

8. A reading apparatus comprising:
    a sensor unit comprising: an illumination apparatus; a light condenser that focuses light reflected after the light is applied to an illuminated object by the illumination apparatus; and a sensor that converts the light focused by the light condenser to an electrical signal; and
    a movement portion that relatively moves at least one of the sensor unit and the illuminated object, wherein:
    the illumination apparatus comprises a light source and an elongated light guide,
    the light guide comprises an emission surface that emits light from the light source and a reflection surface that reflects the light to the emission surface,
    the reflection surface comprises a plurality of diffusion portions that diffuse the light,
    the diffusion portions have a shape of part of a sphere recessed from the reflection surface,
    a depth of each of the plurality of the diffusion portions from the reflection surface is equal to or greater than 16.5% of a diameter of the sphere and equal to or smaller than 50% of the diameter of the sphere, and
    a width of each of the plurality of the diffusion portions in a direction parallel to the reflection surface and orthogonal to a longitudinal direction of the light guide is equal to or greater than 0.1 mm and equal to or smaller than 50% of a width of the reflection surface.

\* \* \* \* \*